United States Patent
Cameron et al.

(10) Patent No.: US 9,863,013 B2
(45) Date of Patent: *Jan. 9, 2018

(54) APPARATUS AND METHOD FOR HEATING A BLAST FURNACE STOVE

(75) Inventors: Andrew M. Cameron, Tansley (GB); Andrew P. Richardson, Clinton, NJ (US)

(73) Assignee: Linde Aktiengesellschaft, Munich (DE)

( * ) Notice: Subject to any disclaimer, the term of this patent is extended or adjusted under 35 U.S.C. 154(b) by 1715 days.

This patent is subject to a terminal disclaimer.

(21) Appl. No.: 13/096,161

(22) Filed: Apr. 28, 2011

(65) Prior Publication Data

US 2012/0214116 A1    Aug. 23, 2012

Related U.S. Application Data (63) Continuation-in-part of application No. 13/031,941, filed on Feb. 22, 2011, now abandoned.

(51) Int. Cl.
| | |
|---|---|
| F23G 7/06 | (2006.01) |
| C21B 9/00 | (2006.01) |
| C21B 9/04 | (2006.01) |
| C21B 9/10 | (2006.01) |

(52) U.S. Cl.
CPC .......... *C21B 9/00* (2013.01); *C21B 9/04* (2013.01); *C21B 9/10* (2013.01); *Y02P 10/122* (2015.11); *Y02P 10/126* (2015.11); *Y02P 10/132* (2015.11)

(58) Field of Classification Search
None
See application file for complete search history.

(56) References Cited

U.S. PATENT DOCUMENTS

| | | | | |
|---|---|---|---|---|
| 2,252,319 A * | 8/1941 | Holden | ............ | 432/31 |
| 2,348,118 A * | 5/1944 | Feige | ............ | 110/205 |
| 2,598,735 A * | 6/1952 | Webb | ............ | 75/464 |
| 3,460,934 A * | 8/1969 | Kelmar | ............ | 75/466 |
| 3,547,624 A * | 12/1970 | Gray | ............ | 75/462 |
| 3,614,074 A * | 10/1971 | Wellford, Jr. | ............ | 432/48 |
| 3,675,600 A * | 7/1972 | Jones | ............ | 110/203 |
| 3,868,211 A * | 2/1975 | Haye et al. | ............ | 431/10 |
| 3,920,382 A * | 11/1975 | Hovis et al. | ............ | 432/209 |
| 4,017,254 A * | 4/1977 | Jones | ............ | 432/72 |

(Continued)

FOREIGN PATENT DOCUMENTS

| | | | |
|---|---|---|---|
| FR | 2 847 659 A1 | 5/2004 | |
| GB | 983499 A | 2/1965 | |

(Continued)

OTHER PUBLICATIONS

International Search Report PCT/US2012/025865, dated May 30, 2012, Authorized Officer: Blaine R. Copenheaver, 10 pp.

(Continued)

*Primary Examiner* — Nathaniel Herzfeld
(74) *Attorney, Agent, or Firm* — Joshua L. Cohen (57) ABSTRACT

A method for heating a blast furnace stove includes combusting fuel in a combustion chamber in the stove, providing combustion gases from the combustion chamber to heat refractory material in the stove, recirculating exhausted combustion gases into the combustion chamber, enriching the combustion chamber with oxygen sufficient for maintaining combustion in the combustion chamber without damaging the refractory material in the stove.

17 Claims, 8 Drawing Sheets

(56) References Cited

U.S. PATENT DOCUMENTS

| | | | | |
|---|---|---|---|---|
| 4,045,212 A * | 8/1977 | Hodes | | 75/575 |
| 4,169,700 A * | 10/1979 | Yoshioka et al. | | 431/174 |
| 4,434,004 A * | 2/1984 | Ratschat | | 75/468 |
| 4,444,555 A * | 4/1984 | Edwardsen et al. | | 432/30 |
| 5,203,859 A * | 4/1993 | Khinkis et al. | | 432/30 |
| 5,259,342 A * | 11/1993 | Brady et al. | | 122/367.1 |
| 5,334,012 A * | 8/1994 | Brock et al. | | 432/106 |
| 5,378,060 A * | 1/1995 | Brock et al. | | 366/25 |
| 5,413,477 A * | 5/1995 | Moreland | | 431/9 |
| 5,433,174 A * | 7/1995 | Brady et al. | | 122/367.1 |
| 5,476,990 A * | 12/1995 | Hittner et al. | | 588/314 |
| 5,616,296 A * | 4/1997 | Hittner et al. | | 266/145 |
| 5,638,773 A * | 6/1997 | Brady et al. | | 122/248 |
| 5,711,018 A * | 1/1998 | Hittner et al. | | 588/314 |
| 5,943,360 A * | 8/1999 | Haissig | | 373/77 |
| 5,956,365 A * | 9/1999 | Haissig | | 373/80 |
| 5,999,556 A * | 12/1999 | Haissig | | 373/9 |
| 6,095,798 A * | 8/2000 | Mitani et al. | | 431/215 |
| 6,102,691 A * | 8/2000 | Mitani et al. | | 431/215 |
| 6,108,363 A * | 8/2000 | Haissig | | 373/77 |
| 6,238,206 B1 | 5/2001 | Cummings et al. | | 431/181 |
| 6,398,547 B1 * | 6/2002 | Joshi et al. | | 432/54 |
| 6,813,902 B2 * | 11/2004 | Streicher et al. | | 65/21.1 |
| 7,669,439 B2 * | 3/2010 | Simpson et al. | | 65/157 |
| 2001/0046649 A1 * | 11/2001 | Schutz et al. | | 431/4 |
| 2003/0047850 A1 * | 3/2003 | Areaux | | 266/44 |
| 2005/0229749 A1 * | 10/2005 | Cameron et al. | | 75/554 |
| 2005/0230885 A1 * | 10/2005 | Cameron et al. | | 266/225 |
| 2007/0154855 A1 * | 7/2007 | Gibson et al. | | 431/9 |
| 2007/0269755 A2 * | 11/2007 | Gibson et al. | | 431/9 |
| 2008/0115535 A1 * | 5/2008 | Wu et al. | | 65/134.4 |
| 2009/0120338 A1 * | 5/2009 | Adendorff et al. | | 110/345 |
| 2009/0229416 A1 * | 9/2009 | Cameron et al. | | 75/708 |
| 2010/0077968 A1 * | 4/2010 | Hendershot et al. | | 122/9 |
| 2010/0081098 A1 * | 4/2010 | D'Agostini et al. | | 431/5 |
| 2010/0252776 A1 * | 10/2010 | Farmayan et al. | | 252/186.24 |
| 2012/0322017 A1 * | 12/2012 | Cameron et al. | | 432/30 |

FOREIGN PATENT DOCUMENTS

| | | |
|---|---|---|
| GB | 998 129 A | 7/1965 |
| WO | WO 2004/094797 A2 | 11/2004 |
| WO | WO 2010/133476 A1 | 11/2010 |
| WO | WO 2011/065907 A1 | 6/2011 |

OTHER PUBLICATIONS

G. Bisio, Energy Savings in Blast Furnace Regenerators, Proceedings Intersociety Energy Conversion Engineering Conference, Jan. 1, 1989, pp. 75-80, vol. 4, University of Genova, Genoa, Italy.

I. J. Cox, The Effect of Blast Furnace Gas Quality and Combustion Controls on Hot Blast Stove Performance, AISE Steel Technology, May 1, 2003, pp. 37-41, vol. 80, No. 5, AISE, Pittsburgh, PA, USA.

R. Van Laar, J. Barel, The Future of Hot Blast Stoves, AISTech 2010 Proceedings of the Iron & Steel Technology Conference, May 3-6, 2010, pp. 587-595, vol. 1, Pittsburgh, PA, U.S.A.

* cited by examiner

APPARATUS AND METHOD FOR HEATING A BLAST FURNACE STOVE

BACKGROUND

The present invention relates to a method for heating a blast furnace stove for use with a blast furnace.

The combustion air supplied to a blast furnace is typically preheated using a stove, comprising refractory material which is heated using a burner. When the material is hot enough, combustion air is passed through the stoves to pre-heat it before injection into the blast furnace. Usually, several stoves are operated in parallel and cyclically so that at least one stove is operated for heating combustion air while the refractory material of at least one stove is heated.

Conventionally, the top gas leaving the blast furnace has a temperature of around 110-120° C. and contains about 20-25% each of CO and $CO_2$. Typically, 3-5% $H_2$ and some $H_2O$ will also be present, but the other major constituent of the top gas is $N_2$ (typically 45-57%). The gas constitutes a low grade fuel, having a relatively low heating value, and is commonly used to fuel the stoves.

The top gas is normally combusted using air-fuel burners in the stoves. In order to ensure the necessary high air blast temperatures needed by the blast furnace, it is well known to enrich the top gas with a high calorific value gas, such as coke oven gas or natural gas. The combustion of such additional fuel leads to larger overall emissions of carbon dioxide from the plant, and is therefore not desirable.

It is also known to oxygen enrich the combustion air used in stack burners. Usually, the enrichment levels needed to reduce or eliminate the need for additional, high-calorific fuels are such as to result in a final oxidant oxygen content in the combustion air of around 28-30%.

Such methods may in some cases render peak flame temperatures high enough to damage the refractory material of the stove.

The blast furnace itself is a highly efficient counter-current reactor that has evolved over many years. It is approaching the limits of thermodynamic efficiency. Moreover, the blast furnace and its ancillary equipment, such as stoves, are the largest energy consumers in an integrated iron and steel works. Furthermore, the energy consumed in iron making is the dominant factor determining the carbon consumption of the integrated steel making process, and therefore the emissions of carbon dioxide. Therefore, it would be desirable to increase thermal efficiency of blast furnace stoves.

In addition to the problem of high peak temperatures mentioned above, too low flame temperatures or heat input rates will lead to long heating cycles, which is undesirable. In other words, the flame temperature needs to be moderated.

SUMMARY OF THE INVENTION

The present embodiments solve the above described problems and make it possible to achieve other advantages as will be described below.

Thus, the present embodiments relate to a method for heating a blast furnace stove by combusting a fuel with a lower heating value (LHV) of 9 $MJ/Nm^3$ or less in a combustion region in which there is maintained a stable visible flame, arranged in a combustion chamber in the stove, and causing the combustion gases to flow through and thereby heat refractory material in the stove, and is characterized in that the fuel is combusted with an oxidant comprising at least 85% oxygen, and in that combustion gases are caused to be recirculated into the combustion region to dilute the mixture of fuel and oxidant therein sufficiently for the flame not to damage the refractory material.

BRIEF DESCRIPTION OF THE DRAWINGS

In the following, the invention will be described in detail, with reference to exemplifying embodiments of the invention and to the appended drawings, in which.

DETAILED DESCRIPTION

Figure 1:
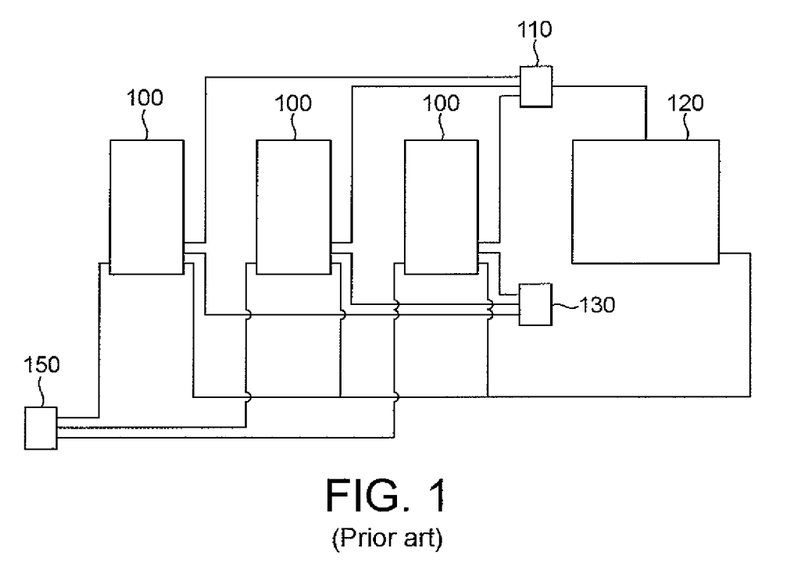
FIG. 1 is a simplified illustration of a blast furnace and three stoves in a conventional iron works.

FIG. 1 illustrates the principal arrangement of a blast furnace 120 and three stoves 100 in an iron works. The operation of the blast furnace 120 produces blast furnace top gas or "top gas", which is fed, using a fuel supply control device 110, to each stove 100 to be used as fuel to heat the stove 100 in question. The top gas is combusted with an oxidant in the form of air, which is supplied by an air supply control device 130.

Each stove 100 comprises refractory material in the form of ceramic bricks or the like, which is first heated and then used to heat blast air which is fed into the blast furnace.

When operated in refractory material heating mode ("on gas" mode), the top gas is combusted in the stove 100 with the oxidant, and the combustion gases are fed to a flue gas treatment device 150, possibly including a conventional carbon capture step.

When operated in blast air heating mode ("on blast" mode), air is led through the refractory material in the opposite direction, and then on to the blast furnace 120.

The stoves 100 are operated cyclically, so that at any point in time at least one stove is operated on blast and the rest of the stoves are operated on gas.

Figure 2:
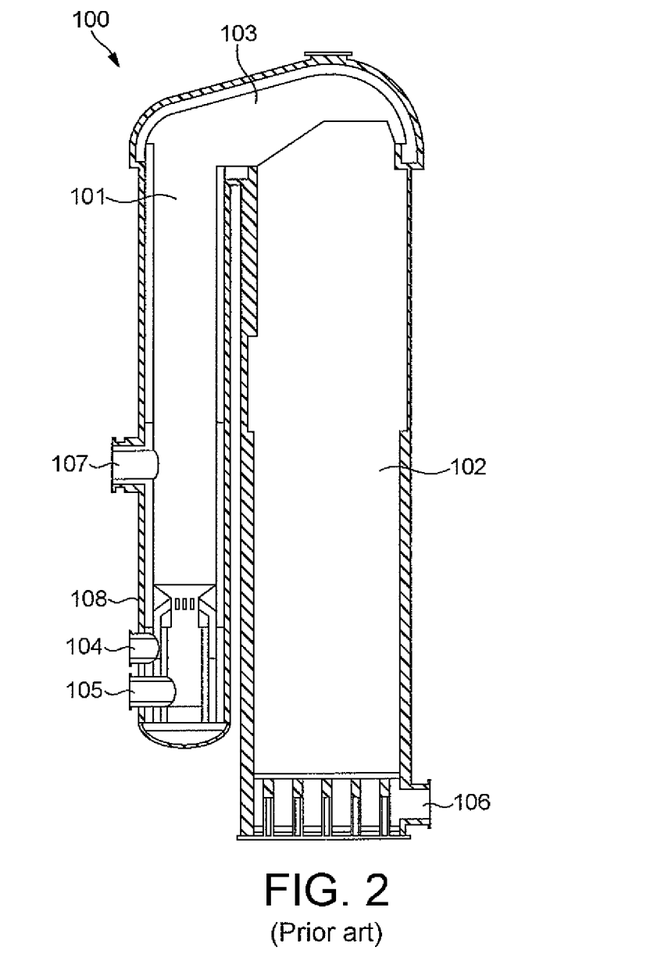
FIG. 2 is a section view illustrating a conventional stove of a modern type with external combustion chamber.

FIG. 2 is a section view through a conventional stove 100 of a modern type. The stove 100 comprises an external combustion chamber 101, refractory material 102 and a dome 103. When operated on gas, it is critical that the temperature in the dome 103 does not become too high, since there is then a risk of damage to the stove 100. It is to be understood that there are also stoves with internal combustion chambers, and that the present invention is equally applicable to the operation of such stoves.

When operated on gas, top gas and air is fed into a combustion zone of the combustion chamber 101, in which combustion takes place, via an air burner 108. The burner 108 comprises a fuel inlet 105 and an air inlet 104. The hot combustion gases then stream up through the chamber 101, past the dome 103 and down through the refractory material 102, thereby heating the latter. When exiting through the port 106, the temperature of the combustion gases is conventionally about 200-350° C.

When the refractory material has reached a predetermined temperature, the operation is switched to on blast operation. Then, air is introduced through the port 106, streams through the hot refractory material 102, via the dome 103 and the combustion chamber 101, and out through an outlet port 107. At this point, the blast air has a typical temperature of 1100-1200° C.

It is preferred, in the context of the present invention, to heat the stove with blast furnace top gas, as described above. It is furthermore preferred to use top gas from a blast furnace to which blast air is provided from the stove. This allows for the arrangement of the stove near the blast furnace, is energy efficient and leads to low total emissions from the plant.

However, it is to be understood that the present invention can be equally advantageously applied to stoves heated with other low-grade fuels. By way of example, typical chemical compositions (percentage values) and lower heating values (LHV) are provided in Tables I and II, respectively, for blast furnace top gas and converter off-gas.

TABLE 1

|  | $N_2$ | $O_2$ | $H_2$ | CO | $CO_2$ | $CH_4$ | $C_mH_n$ | $H_2O$ |
| --- | --- | --- | --- | --- | --- | --- | --- | --- |
| Top gas | 52.5 | 0.55 | 2.3 | 23.5 | 20 | — | — | 1.15 |
| Off-gas | 17.2 | 0.1 | 2.5 | 64.5 | 15.6 | — | — | 0.1 |

TABLE 2

|  | LHV (MJ/Nm$^3$) | LHV (MJ/kg) |
| --- | --- | --- |
| Top gas | 3.2 | 2.4 |
| Off-gas | 6.3 | 8.4 |

According to the present invention, the stove is heated with a gaseous fuel the LHV value of which is not higher than 9 MJ/Nm$^3$. Use of such low-grade fuel will draw maximum benefit from the possible cost benefits of the present invention. The fuel may comprise a certain addition of another, more high-grade fuel, as long as the LHV value of the mixture is equal to or less than 9 MJ/Nm$^3$. In order to minimize cost and emissions, it is however preferred not to add high grade fuels prior to combustion.

According to the present invention, such a low-grade fuel is used for heating the stove by combusting it, not with air or slightly oxygen-enriched air, but with an oxidant comprising at least 85% by weight, preferably at least 95% by weight, oxygen, where the oxidant most preferably is industrially pure oxygen having an oxygen content of essentially 100%.

This will increase fuel efficiency, since the nitrogen ballast present in air does not need to be heated. Moreover, by reducing the nitrogen ballast in the combustion products, the necessary flame temperatures can be attained without the need to supplement the low-grade fuel gas with high calorific fuels. The reduced energy demand will facilitate increased power generation and/or lead to a reduced need for import gas, thus improving fuel management.

Normally, using an oxidant with such large oxygen contents would lead to peak temperatures high enough to damage the dome and refractory material of the stove.

However, it is possible to use this type of oxidant under condition that the stove combustion gases are recirculated into the combustion zone to such extent that the mixture of fuel and oxidant therein is diluted sufficiently for the combustion in the combustion region to form a stable, visible flame at temperatures that do not damage the dome and the refractory material.

That "combustion gases are recirculated into the combustion region" herein refers to combustion gases located outside of the combustion region being recirculated back into the combustion region. Such combustion gases may originally be located inside the combustion chamber itself, but outside of the part of the combustion chamber occupied by the region in which combustion mainly takes place (the "combustion region"). Thus, in this case combustion gases are in fact recirculated within the combustion chamber. Alternatively, such combustion gases may be recirculated from outside of the combustion chamber back to the combustion region.

As will be described in further detail in the following, the dilution of the reactants may be achieved either by creating heavy turbulence inside the combustion chamber using high-velocity lancing of oxidant, possibly using a staged combustion scheme, and/or the recycling of flue gases from the stove back into the combustion zone.

In accordance with the invention, it is possible to achieve sufficiently low peak flame temperatures so as not to damage the refractory material of the stove.

Additionally, when a high-oxygen oxidant is used to combust low-grade fuels such as blast furnace top gas, the $CO_2$ contents of the combustion gases become considerably higher as compared to when using air or slightly oxygen-enriched air as the oxidant. Since conventional carbon capture techniques tend to be considerably cheaper per unit captured $CO_2$ when the treated gas contains a larger share of carbon dioxide, this leads to considerable cost savings when using such a carbon capture step to treat the stove combustion gases.

Figure 3:
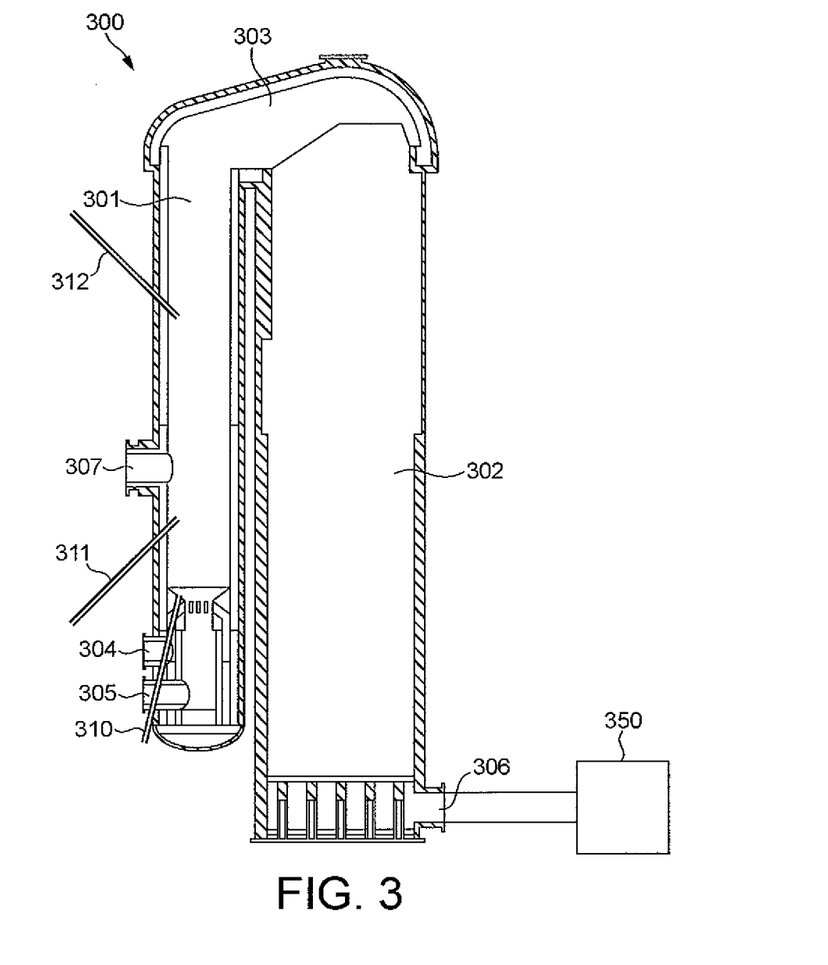
FIG. 3 is a section view of a stove with additional lances according to the present embodiments.

FIG. 3 shows a preferred embodiment of the invention. A stove 300, which is similar to the conventional one 200 shown in FIG. 2, comprises a combustion chamber 301, refractory material 302, a dome 303, an inlet 304 used for combustion air when the stove is operated in a conventional manner with air combustion, another inlet 305 used for low-grade fuel such as top gas, and ports 306, 307 similar to ports 206, 207. Instead of combusting the low-grade fuel with air, one or several lances 310, 311, 312 are inserted into the combustion chamber, and are used to supply the above defined high-oxygen oxidant into the combustion zone. The oxidant may be provided by local oxygen production or using an externally provided oxidant.

In all embodiments described herein, the total amount of oxidant per time unit is balanced against the amount of supplied low-grade fuel, so as to create the desired combustion conditions in terms of stoichiometry.

It is preferred that each lance 310, 311, 312 supplies oxidant to the combustion zone at high velocity, preferably at least 200 m/s, more preferably at least sonic velocity. Such high-velocity lancing leads to heavy turbulence in the combustion chamber, in turn entraining combustion gases into the combustion zone and thereby diluting the flame so as to render it diffuse with a peak temperature that does not damage the refractory material of the stove.

According to one preferred embodiment, a lance 310 is arranged with its orifice in close proximity to the orifice of the fuel inlet 305. According to another preferred embodiment, a lance 311 is arranged at a position at a distance from the orifice of the fuel inlet 305. Depending on the geometry of the combustion chamber 301, one of these arrangements, or a combination of both, may provide the best recirculation of combustion gases into the combustion zone. A supplementary lance 312, arranged further downstream in relation to the other lance or lance 310, 311, can be used to provide a staged combustion process, whereby the total flame volume can be made even larger. Naturally, more than one lance of each of the described types 310, 311, 312 may be arranged to complement each other. In case the oxidant is lanced in close proximity to the fuel inlet 305, it is preferred to also lance oxidant further downstream so as to create a staged combustion process.

Figure 4:
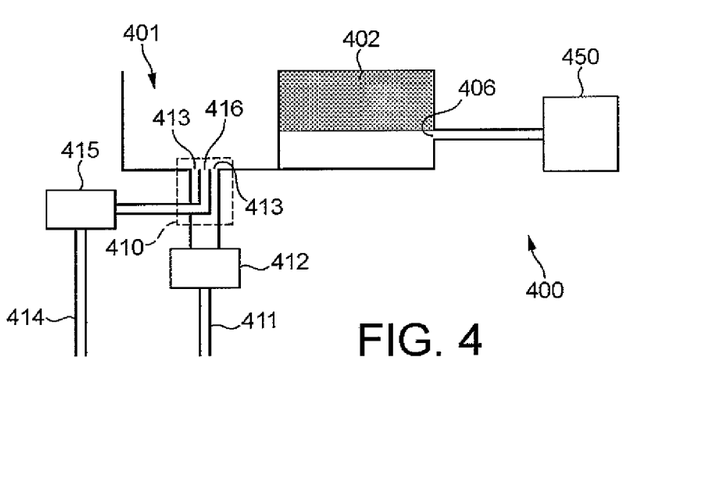
FIG. 4 is a detail section view of a stove with an oxyfuel burner according to the present embodiments.

FIG. 4 is an overview illustration of another preferred embodiment, in which a blast furnace stove 400 comprises a combustion chamber 401, refractory material 402 and a port 406.

Figure 6:
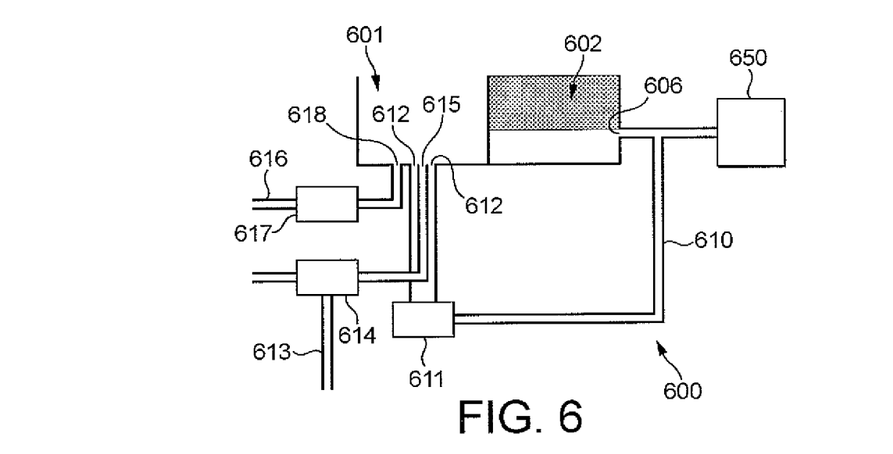
FIG. 6 is a detail section view of a stove with an ejector lance according to the present embodiments.

Low grade fuel is supplied via a supply conduit 411, a supply device 412 and an inlet 413. Oxidant is supplied via a supply conduit 414, a supply device 415 and a lance comprising an orifice 416. The lance is arranged so that its orifice 416 is arranged adjacent to the fuel inlet 413. Preferably, the lance runs coaxially to the fuel inlet 413, as depicted in FIG. 6. By such an adjacent arrangement, especially when coaxial, and when the oxidant is lanced at the above described high velocities, the fuel is efficiently entrained into the combustion zone by ejector action on the part of the high velocity oxidant. As a result, heavy recirculation of combustion products is achieved in the combustion chamber 401, in particular recirculating combustion gases into the combustion zone expanding the flame front. When such a high-velocity lance is arranged adjacent to the fuel inlet 413, it is preferred to simultaneously use a secondary oxidant lance 312, providing part of the totally supplied oxygen at another location in the combustion chamber 401 downstream of the fuel inlet 413, creating a staged combustion of the low-grade fuel and thereby facilitating the achievement of a flame which is diffuse and which does not have a peak temperature sufficiently high to damage the refractory material of the stove.

The stove 400 can be part of a standing iron making plant and adapted to operate in accordance with the invention from a conventional mode of operation in which air is used to support combustion of the blast furnace gas, in which the blast furnace gas is supplemented by a coke oven gas or natural gas and in which there is no recirculation of the combustion products with the stove 400.

According to a preferred embodiment, an existing, conventional, air burner, which was used to heat the existing stove 400 previously, is in an initial step replaced by an oxyfuel burner 410 comprising the above described fuel inlet 413 and oxidant lance. An "oxyfuel" burner herein refers to a burner driven with a fuel and an oxidant, wherein the oxidant comprises a large part oxygen, preferably at least 85% oxygen, more preferably at least 95% oxygen.

According to an alternative, preferred embodiment, the existing air burner described above is, in an initial step, supplemented with one or several high-velocity oxidant lances as described above, and the air supply is terminated.

As described above, such high velocity lancing yields heavy turbulence inside the combustion chamber 301, 401, leading to sufficiently low peak flame temperatures for the refractory materials in the stove not to be damaged.

However, the mass flow rate of the combustion gases will be lower when using a high-oxygen oxidant as compared to when using air as the oxidant. This would lead to smaller convective heat transfer to the refractory material and hence longer heating cycle times. Therefore, when converting an existing stove for high-oxygen oxidant operation, flue gases are recycled from the stove back into the combustion zone as described below in connection to FIGS. 5 and 6.

Figure 5:
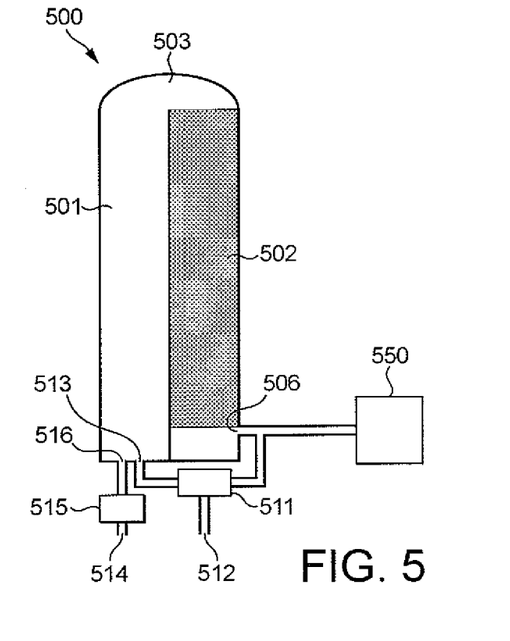
FIG. 5 is a section view of a stove with combustion gas recycling according to the present embodiments.

Thus, FIG. 5 is an overview illustration of a stove 500 according to another preferred embodiment, comprising a combustion chamber 501, refractory material (sometimes referred to as "checker work") 502 and a dome 503.

During on gas operation, the combustion gases leave the stove 500 through a port 506. However, part of the combustion gases are recycled back to the combustion region in the combustion chamber 501 via a recycling device 511. The feedback device 511 may include a propelling device, such as a fan, to feed the recycled combustion gas to the combustion chamber 501.

The recycling device 511 is also arranged to mix the recycled combustion gas with a high-oxygen oxidant of a composition as described above, provided via a supply conduit 512. The mixing may take place using conventional diffusers. The mixture of recycled combustion gas and oxidant is then supplied to the combustion chamber 501 via an inlet 513. A low-grade fuel, such as top gas from the blast furnace, is provided, via a supply conduit 514, a supply device 515 and an inlet 516. In the combustion zone, the fuel is hence combusted with the oxidant in the presence of the combustion gases that have been recycled into the combustion zone after they have already past the stove 500. This way, the flame in the combustion chamber 501 is diluted.

Using such flue gas recycling, it is possible to reach convective heat transfer rates high enough so as to be able to maintain the heating cycle time of an existing stove in which a method according to the present invention is applied. This is achieved by recycling a sufficient amount of combustion gases to maintain the gas mass or thermal energy flow per time unit through the stove 500, at a level which is at least the same as the gas mass or thermal energy flow per time unit which was used when the existing stove was operated, prior to conversion to operation according to the present invention, using a low-oxygen oxidant with no recycling.

As previously mentioned, the method according to the invention replaces air combustion of a calorifically enriched low calorific value fuel gas with oxy-fuel combustion, in which the flame is diluted by recirculating flue gas, by example by high impulse mixing of the combustion space using lances for the injection of the oxidant. The need for a high cost high calorific value booster fuel gas is eliminated and the stove is fuelled using blast furnace gas alone. The stoves typically account for around 10% of the total energy demand for integrated steel-making and some 18% of the energy delivered to the stoves is lost in the flue gas. Recycling flue gas reduces this energy loss and lowers the amount of energy that must be supplied to the stove from combustion of a fuel gas. The method according to the invention therefore combines some of the benefits of waste heat recovery with those of oxy-fuel combustion.

Consider a hypothetical example of a 1500 $m^3$ working volume blast furnace operating with a productivity of about 2.2 $t/m^3/d$. Such a furnace would produce some 138 tonnes of hot metal per hour and based on typical blast volumes, might be expected to consume 138,000 Nm3/h of hot blast.

To achieve a hot blast temperature of 1200° C. would require a stove burner flame temperature about 150° C. higher and some 230 GJ/h would be required to heat the air to this temperature. For a stove efficiency of around 80% this means the energy input to the stoves would be around 290 GJ/h or 145 GJ/h for each stove assuming two stoves are 'on-gas' simultaneously. It is well established that for normal stove operating conditions, about 18% of the energy input to the stoves exits in the flue gas. It has been estimated that for the conditions considered this would result in a flue gas temperature of around 250° C.

These conditions have been used to establish hypothetical heat and mass balances for 3 modes of operation, "air-fuel" (i.e. conventional operation without flue gas recirculation; "oxygen-enriched" (i.e. as "air-fuel", but with the air enriched in oxygen) and "flue gas recycle" (i.e. in accordance with the method of the invention). The calculations have been done to ensure a constant flame temperature and constant mass flow of combustion products, so that conditions for convective heat transfer are maintained. Flame stoichiometry has, in each case, been adjusted to ensure 1% excess oxygen in the flue gas. The results are compared in Table 3.

TABLE 3

| | BFG Nm3/h | COG Nm3/h | Air Nm3/h | Oxygen Nm3/h | Flue Recycle Nm3/h | Heat of Combustion GJ/h | Flame Temp. ° C. | Flue Mass Flow kg/min | Flue Gas % $O_2$ | Flue Gas % $CO_2$ |
|---|---|---|---|---|---|---|---|---|---|---|
| Air-Fuel | 34000 | 2400 | 34200 | 0 | 0 | 145 | 1347 | 1539 | 1 | 23 |
| Oxygen Enriched | 40200 | 1200 | 26800 | 1300 | 0 | 145 | 1347 | 1545 | 1 | 27 |
| Flue Gas Recycle | 44700 | 0 | 0 | 6220 | 14490 | 139 | 1347 | 1541 | 1 | 41 |

It can be seen that for the conditions considered, oxygen enrichment of the air supplied to the stoves reduces, but does not eliminate, the amount of coke oven gas employed. Blast furnace gas flow is increased to ensure the heat input of 145 GJ/h is maintained. The $CO_2$ content of the flue gas increases marginally due to the elimination of some nitrogen from the system.

The introduction of flue gas recirculation removes the need for calorific enrichment of the fuel gas. This is because a further modest increase in the flow of blast furnace gas, combined with the recovery of the sensible heat contained in the flue gas, is sufficient to enable the desired flame temperature to be reached. It is to be understood that with flue gas recirculation, the oxidant is not air but a gas mixture containing at least 85% by volume of oxygen or essentially pure oxygen. (The calculated results shown in Table 3 are based on the latter). The energy input from combustion is decreased by about 4% due to recovery of energy from the recycled flue gas.

Air is eliminated and combustion is sustained by the use of industrial oxygen. Importantly it can be seen that the $CO_2$ content of the flue gas has increased from the initial 23% to 41%. This equates to 50 tonnes of $CO_2$ per hour for a single stove or 100 tonnes for the two stoves 'on-gas'. 75 tonnes of this would be available for carbon capture and sequestration whilst the remainder is recycled.

For the hypothetical case under consideration it is reasonable to assume that the 138 tonnes of hot metal produced each hour is converted to 150 tonnes of slab or other metal product which accounts for the likelihood of scrap additions during steel-making.

Applying industry benchmark figures, it can be estimated that the entire integrated steel plant would generate about 280 tonnes of $CO_2$ per hour. Hence, for the example considered, recycling flue gas to the stoves (assumed to be Cowper stoves) makes some 27% of the plant-wide $CO_2$ emissions available for carbon capture.

Whilst simple heat and mass balances, such as those detailed in Table 1, serve to illustrate the main advantages achievable by the method according to the invention, they do not completely reflect the benefits. In particular, they do not take account of the improved heat transfer conditions generated on switching from air-fuel to oxy-fuel combustion. For this purpose a dynamic model that accounts for changes to the overall heat transfer coefficient as a function of composition, temperature and mass flow in the refractory checker work can be used. A number of modelling studies of hot blast stoves, have shown that the heat transfer taking place can be accurately represented by an overall or 'lumped' heat transfer coefficient that combines the effects of convection and radiation. So that for the gassing cycle $$\alpha = \alpha_c + \alpha_r$$

Where;

$\alpha_c$=convective heat transfer coefficient, and;

$\alpha_r$=radiative heat transfer coefficient

The convective heat transfer coefficient is related to the mass flow rate and may be calculated from the Sieder-Tate or Hausen equations. The radiant heat transfer coefficient is derived from the Stefan-Boltzmann law which can be expressed in the form;

$$h_r = 1.713 \times 10^{-8} \left[ \frac{\varepsilon_g \cdot T_g^4 - \alpha_g \cdot T_B^4}{T_g - T_B} \right]$$

Where;

$\varepsilon_g$=emissivity of the gas which is a function of composition and temperature and may be derived from grey gas models or from Hottel charts.

$\alpha_g$=absorptivity of the gas $T_g$=gas temperature.

$T_B$=mean temperature of local checker work.

A zonal model that incorporates such principles and accounts for heat transfer to and within the checkers (refactory) has been used to make a more detailed assessment of the benefits. The baseline for comparison is operational data from a set of modern Cowper stoves generating an industry benchmark hot-blast temperature of 1250° C. The results are shown in Table 4.

TABLE 4

|  |  | Conventional Operations | Oxygen Case 1 | Oxygen Case2 | Oxygen Case 3 |
| --- | --- | --- | --- | --- | --- |
| Blast Cycle |  | 30 | 30 | 25 | 25 |
| Gas Cycle (8 minute change) |  | 52 | 52 | 42 | 42 |
| BFG | Nm3/h | 91,237 | 133,742 | 134,636 | 147,292 |
| BFG HV | MJ/Nm3 | 3.1 | 3.1 | 3.1 | 3.1 |
| Natural Gas | Nm3/h | 4,893 | 1,224 | 1,262 | 1,296 |
| NG HV | MJ/Nm3 | 33.9 | 33.9 | 33.9 | 33.9 |
| Oxygen Rate - per stove | Nm3/h | 0.00 | 23,665 | 21,854 | 23,665 |
| Total Heat Input |  |  |  |  |  |
| per stove | MJ/h | 448,707 | 456,094 | 460,153 | 500,540 |
| per stove | MJ/cycle | 388,879 | 395,281 | 322,107 | 350,378 |
| total - 3 stove operation | MJ/h | 777,759 | 790,563 | 773,058 | 840,907 |
| Wind Rate | Nm3/h | 427,210 | 427,210 | 427,210 | 427,210 |
| Cold Blast | ° C. | 200 | 200 | 200 | 200 |
| Hot Blast | ° C. | 1248 | 1246 | 1248 | 1261 |
| Dome Temperature | ° C. | 1385 | 1385 | 1383 | 1384 |
| Final Stack Temperature | ° C. | 399 | 399 | 375 | 399 |
| Projected Annual Cost Saving € |  | NA | 1,554,375 | 2,660,237 | 4,611,263 |
| Stove Flue Gas Volume | Nm3/h | 205,875 | 196,076 | 201,981 | 207,466 |
|  | CO2 | 23.05% | 45.43% | 45.43% | 45.43% |
|  | Nm3/h - CO2 | 47,454 | 89,077 | 91,760 | 94,189 |

It is interesting to compare these cases in a little more detail:

The conventional operations show that the stove uses a significant level of natural gas enrichment to generate a high blast temperature of 1248° C.

All three examples ("Oxygen Cases" 1, 2 and 3) are in accordance with the inventors. In 'Oxygen Case 1' the model has been run retaining the same blast temperature, blast volume, and stack temperature as in the conventional operations. This case generates comparable results to a steady state heat balance because although radiation heat transfer to the (refractory) checker bricks has improved, the benefit of this is disguised by forcing the model to retain a constant stack temperature. In fact, since the heat capacity of the $CO_2$ contained in the recycled flue gas, is higher than that of the nitrogen it is replacing, the overall impact is that slightly more energy is needed to maintain a constant dome (and blast) temperature. Nevertheless, replacing expensive natural gas with a cheaper fuel source is sufficient to compensate for both the higher energy input and the cost of the oxygen consumed. It is worth pointing out that the overall heat transfer coefficients calculated by the model show a 13.5 increase relative to air fuel combustion near the top of the checkers, but even at the lower temperatures towards the base of the checkers the overall heat transfer coefficient had increased by some 8.5%.

In 'Oxygen Case 2' the enhanced heat transfer conditions have been accounted for by allowing the stack gas temperature to re-equilibrate to a lower temperature. It can be seen that since more heat is retained in the checkers, the stack temperature drops by some 25° C. The net effect is that it is possible to lower gassing cycle time whilst retaining the same blast temperature. The total energy input for a 3 stove operation is marginally reduced but blast temperature and volume is maintained even at a lower stack gas volume. This is an important feature that could be exploited under plugged stove conditions.

In 'Oxygen Case 3' the reduction in stack gas temperature by increasing the firing rate until the original stack gas temperature has been exploited by increasing the firing rate until the original stack gas temperature has been restored. It is apparent that the firing rate can be increased by almost 10%. This is enough to increase the blast temperature by some 13° C., enough to result in significant coke savings at the blast furnace.

Figure 7:
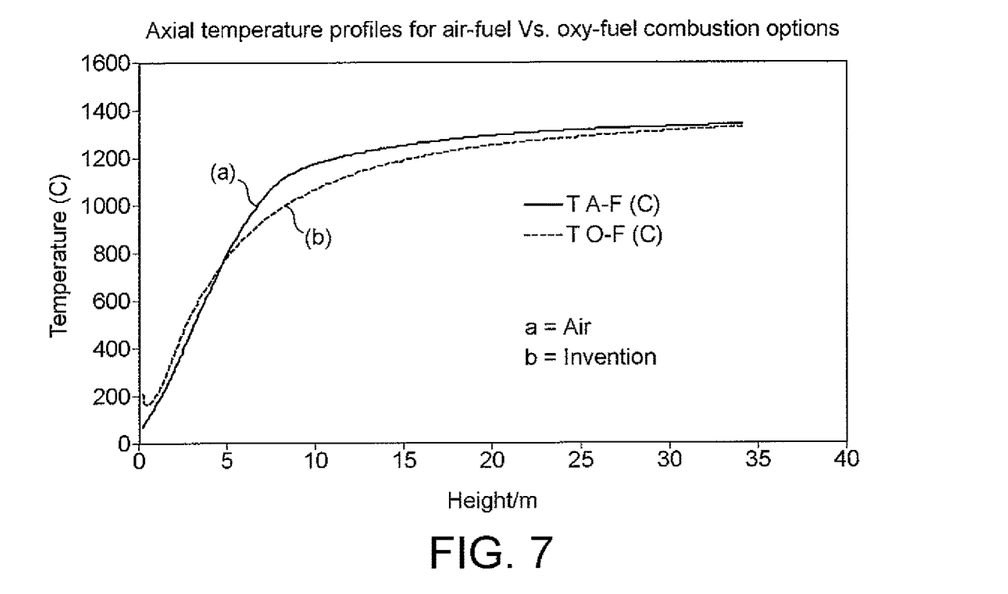
FIG. 7 is a graph illustrating the axial temperature profile for combustion in the combustion chamber of a burner stove (a) operated conventionally with air supporting combustion and without recirculation of the flue gas and (b) operated in accordance with the embodiments.
Figure 8:
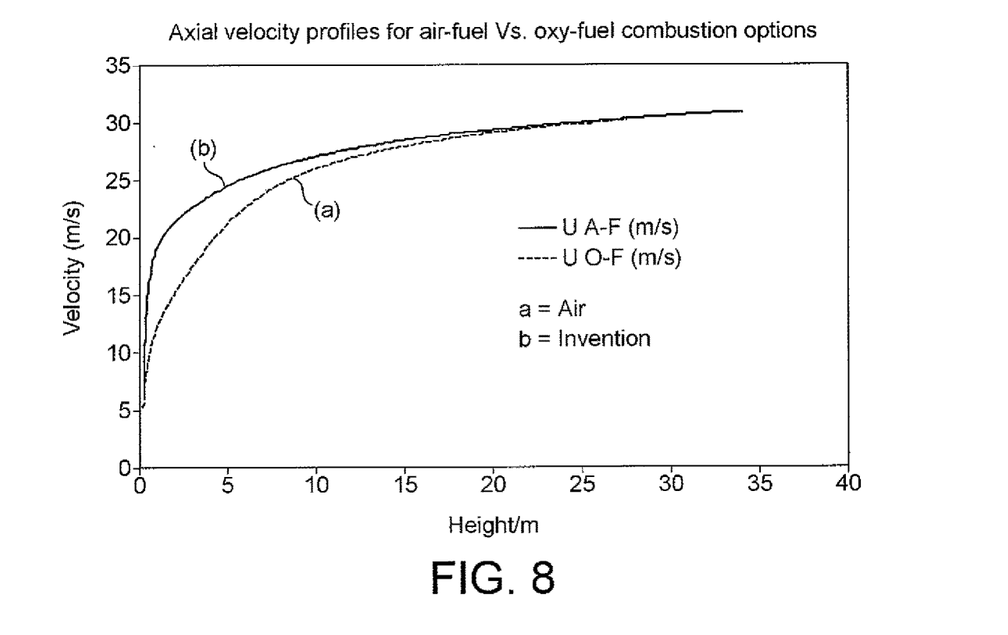
FIG. 8 is a graph similar to FIG. 7, but showing the axial velocity profile for the same two combustion cases.
Figure 9:
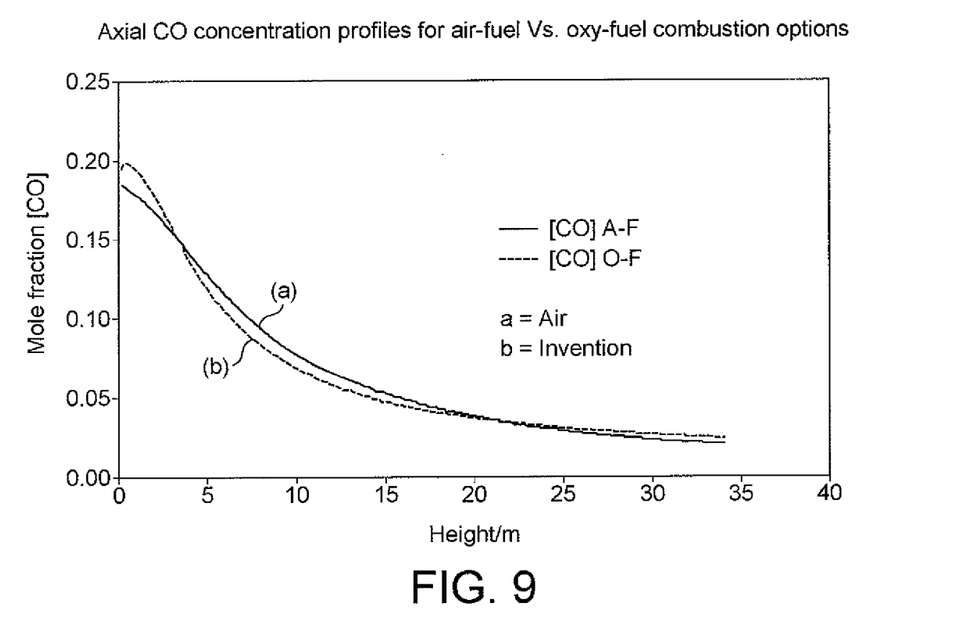
FIG. 9 is a graph similar to FIG. 7 but showing the axial carbon monoxide concentration profile for the same two combustion cases.

Computational fluid dynamic (CFD) modelling has been used alongside the dynamic heat balance, to develop a detailed understanding of temporal and spatial variations of temperature, velocity and concentration that occur during a complete stove cycle. Some relevant CFD results are presented in FIGS. 7 to 9. These show that the method according to the invention can be performed to such similar flame profiles to those achieved in conventional operation of the blast furnace stove with air as the oxidant and without recirculation of the flue gas. It can therefore be inferred that the method according to the invention can be operated with a stable, visible flame or flames and without generating peak flame temperatures likely to damage the stove refractory or checker work.

Referring now to FIG. 5, according to a preferred embodiment, enough combustion gases are recycled to essentially maintain or increase the gas mass flow per time unit through the refractory material.

According to an alternative preferred embodiment, enough combustion gases are recycled to essentially maintain or increase the thermal energy throughput through the refractory material. This takes into consideration the different heat capacities for various inert components in the combustion gases. In this case, it is also preferred that enough combustion gases are recycled so that the flame temperature is essentially maintained or decreased.

As is also shown in Table 3, the $CO_2$ contents of the flue gases vented from the stove 500 are much higher 41% as compared to 23% in the conventional operation mode. The costs per unit weight captured $CO_2$ for conventional carbon capture techniques is significantly decreased as the $CO_2$ concentration increases from low levels up to a level of roughly 50-60%. Concentrations increased beyond this limit will provide smaller gains. As a result, the costs for a carbon capture step for treating the stove flue gases may be reduced significantly per unit weight captured $CO_2$ when a high-oxygen oxidant is used in accordance with the present invention.

According to a preferred embodiment, an existing, conventional, air burner, which was used to heat the existing stove 500 previously, is in an initial step replaced by a fuel inlet 516 and an inlet for recycled combustion gases 513, and the fuel is then combusted with the above described high oxygen oxidant. To this end, it is preferred that the oxidant is submitted by premixing with the recycled combustion gases. It is alternatively preferred that such premixing is combined with one or several lances as described above.

FIG. 6 is an overview illustration of another preferred embodiment of the present invention, showing a blast furnace stove 600 with a combustion chamber 601, refractory material 602, a port 606, a conduit for recycled combustion gases 610, a recycle device 611, a fuel supply conduit 616, a fuel supply device 617 and a fuel inlet 618.

Oxidant is supplied via an oxidant supply conduit 613 and an oxidant supply device 614 to an oxidant lance arranged so that the orifice 615 of the lance is arranged adjacent to an orifice 612 for supply of recycled combustion gases, supplied from the recycle device 611. Preferably, the oxidant lance runs coaxially with the recycled combustion gas inlet 612. In a way which is similar to the function of the coaxial lance orifice 416 as described in connection to FIG. 4, such an adjacent arrangement, especially when coaxial, will efficiently entrain the recycled combustion gases into the combustion zone by ejector action on the part of the high velocity oxidant, creating more combustion gas recirculation in the combustion chamber 601. At the same time, there is no need for a separate propelling device in the recycling device 611, since the recycled combustion gases will be propelled by the ejector action at the orifice 615.

The embodiment shown in FIG. 6 is advantageously combined with an additional oxidant lance, providing additional oxidant at a location in the combustion zone located at a distance from the orifice 615, thereby achieving a staged combustion in the combustion zone.

Figure 10:
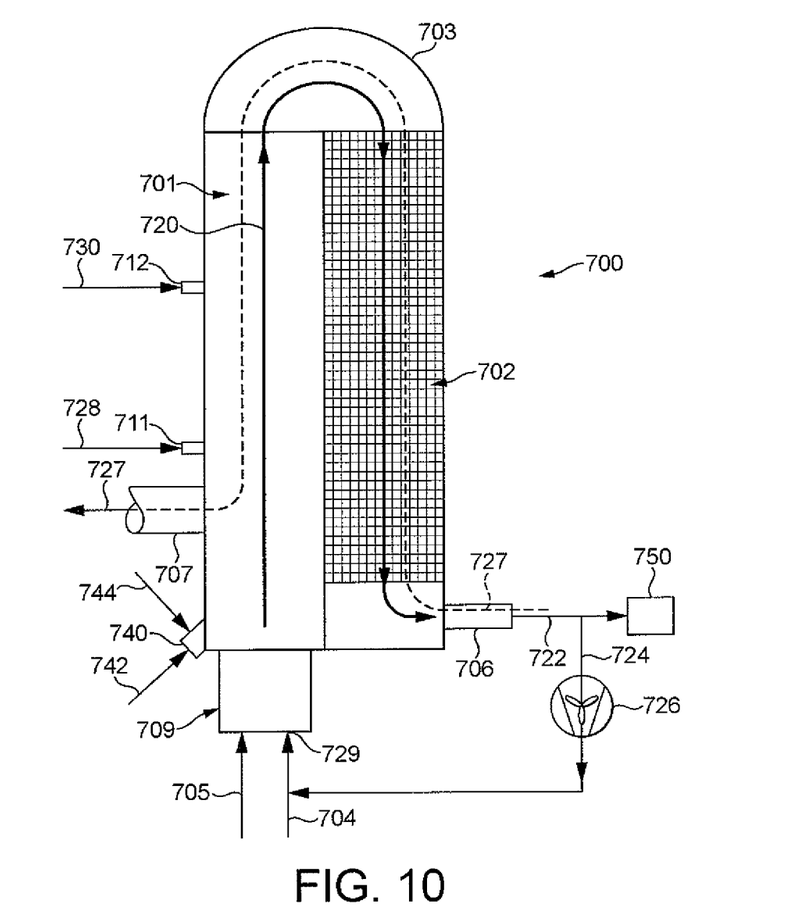
FIG. 10 is a section view of a stove with combustion gas recycling according to another embodiment.

Referring to FIG. 10 there is shown another embodiment of a stove for use with for example a blast furnace. The stove is shown generally at 700 and includes a combustion chamber 701, refractory material 702, a dome 703, an oxygen inlet stream 704, and a fuel inlet stream 705 used for low-grade fuel such as for example top gas or blast furnace gas which is introduced to the combustion chamber 701 through a primary or main burner 709. Combustion products created during the firing cycle to heat the refractory material 702 are directed from the combustion chamber 701 through the refractory material for discharge as indicated by arrow 720. Exhaust combustion products 722 discharged from the port 706 may be returned through line 724 as recycled flue gas back into and mixed with the oxygen inlet stream 704. The recycled combustion products which have been discharged from the port 706 may be moved through the line 722 by a propelling device 726 such as a fan to feed the recycled combustion products back to the main burner 709. The combustion products 722 recycled through the line 724 are mixed with the oxygen inlet stream 704 and form a mixed oxidant stream 729 for introduction into the main burner 709.

FIG. 10 further shows a port 707 having one end in communication with the combustion chamber 701 and another end in communication with the blast furnace (not shown). Such construction provides for the "blast cycle", wherein the flow through the stove is reversed such that air shown generally by arrow 727 introduced into the stove proximate or through port 706 flows through the refractory material 702 and becomes heated, and thereafter flows through the combustion chamber 701, then through the exhaust port 707 to the blast furnace, as shown by the arrow 727.

One or a plurality of further oxidant streams 728,730 may be supplied to the combustion chamber 701 through a plurality of lances 711,712. The lances 711,712 are in communication with the combustion chamber 701 to provide the additional oxidant to the combustion chamber.

At least one oxy-fuel burner 740 is mounted for communication with the combustion chamber 701 downstream of the main burner 709. The oxy-fuel burner 740 combusts fuel 742 and an oxidant 744 supplied to the burner to provide further combustion capability to the combustion chamber 701. The oxy-fuel burner 740 may function as a pilot flame to fire or combust the balance of fuel gas introduced by the main burner 709 into the combustion chamber 701.

The provision of at least one separate oxy-fuel burner 740 in addition to the main burner 709 overcomes potential problems which may arise from the operation of the main burner with the mixture of recycled flue gas and oxygen. In Table 3 above, the mixture of recycled flue gas and oxygen will yield an oxygen concentration of approximately 30% $O_2$, determined by the equation $6220 \div (6220+14490)$. However, for blast furnace gases with low calorific values and in order to operate with acceptable flame temperatures, an oxidant with a bulk oxygen concentration of up to 50% may be required. Such high oxygen concentrations may not be able to be safely utilized in existing supply lines or within the main burner 709. To overcome this problem, less oxygen is supplied to the main burner 709, and additional oxygen required for complete combustion in the combustion chamber 701 is provided to the oxy-fuel burner 740 firing into the combustion chamber 701, and also potentially to the oxidant lances 711,712. This diversion of oxygen reduces the concentration of oxygen within the main burner 709 to acceptable levels for material compatibility. Oxygen concentrations should be limited to below 25-28% in such systems and in this case, the balance of the oxygen is supplied via the at least one oxy-fuel burner 740 and optionally by the oxidant lances 711,712. It is possible that a significant proportion of the total oxygen needed would have to be supplied by the oxy-fuel burner 740 and/or the lances 711,712. For example, in a case where a bulk oxygen concentration of 44.6% $O_2$ would be required, 52% of the oxygen would have to be diverted to the oxy-fuel burner 740 or lances 711,712 in order to reduce the oxygen concentration in the mixed oxidant stream 729 to 28% $O_2$.

The oxy-fuel burner 740 may be oriented so that it operates as a pilot flame. In such orientation for this mode of operation, the oxy-fuel burner 740 is disposed and oriented so that the resultant oxy-fuel flame would intersect the main flow issuing from the main burner 709 to promote mixing and reaction of the flows from the oxy-fuel burner 740 and the main stove burner 709 in the combustion chamber 701.

As indicated above, it is furthermore preferred that the stove 300, 400, 500, 600, 700 is connected to a respective carbon capture step 350, 450, 550, 650, 750, which may be conventional per se, separating the carbon dioxide contents of the combustion gases vented from the stove before the combustion gases are released into the environment.

When the age of a blast furnace stove approaches its expected useful life, it is preferred to apply one of the herein described embodiments, or a combination of several of them, to the stove.

This way, the useful life of the stove may be prolonged, operating it with lower flame temperatures, with maintained production rates in terms of blast air, better fuel economy and lower emissions.

Thus, a method and apparatus according to the present invention will allow a blast furnace stove to be operated only on a low grade fuel such as blast furnace top gas, with no need for higher calorific value fuel enrichment and no risk for temperature-induced stove damage, while producing flue gases that are better suited for carbon capture. In addition, it allows the useful life of a stove to be prolonged.

If sufficient recycling of combustion gases is used, it is also possible to achieve the same amount and quality of blast air in an existing stove which is converted, according to what has been described above, for operation with a high-oxygen oxidant, and which stove is provided with the combustion gas recycling arrangement described in connection to FIG. 5, 6 or 10. Above, preferred embodiments have been described. However, it is apparent to the skilled person that many modifications may be made to the described embodiments without departing from the present invention.

For example, any one of the methods for creating recirculation of combustion gases as described in connection to FIGS. 4 to 6 and 10 may advantageously be supplemented with one or several of the various oxidant lances as described in connection to FIG. 3.

Moreover, the ejector-propelled recirculated combustion gases method as described in connection to FIG. 6 may advantageously be premixed with a certain amount of high-oxygen oxidant in a way similar to the one described in connection to FIG. 5.

Also, the ejector-propelling of pre-mixed or non-pre-mixed recycled combustion gases as described in connection to FIG. 6 may advantageously be combined with ejector-propelling of low-grade fuel as described in connection to FIG. 4.

Heat may be recovered from combustion gases that are not recycled. Additionally or alternatively, the combustion gas may be subjected to carbon capture.

The method according to the invention may be applied to Kalugin blast furnace stoves as an alternative to the stores illustrated in the drawings.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A method for heating a blast furnace stove, comprising:
   combusting fuel in a combustion chamber in the stove,
   providing combustion gases from the combustion chamber to heat refractory material in the stove,
   recirculating exhausted combustion gases into the combustion chamber,
   enriching the combustion chamber with oxygen, the enriching comprising delivering a balance of total oxygen required in an amount sufficient for maintaining combustion in the combustion chamber with at least one oxy-fuel burner in communication with the combustion chamber without damaging the refractory material in the stove.

2. The method of claim 1, further comprising providing the combustion gases to the refractory material and recycling the combustion gases from the refractory material into the combustion chamber.

3. The method of claim 2, further comprising mixing the recycled combustion gases with said oxygen for providing a recycled oxygen mixture to be introduced into the combustion chamber.

4. The method of claim 1, wherein the fuel comprises a gaseous substance selected from blast furnace gas, converter top gas, coke oven gas, natural gas, propane, liquefied petroleum gases, and mixtures thereof.

5. The method of claim 1, wherein the fuel comprises calorifically enriched blast furnace top gas.

6. The method of claim 1, wherein maintaining the combustion is at a temperature below 1400° C.

7. The method of claim 1, further comprising positioning the at least one oxy-fuel burner to fire across a flow stream provided to the combustion chamber from a burner of the stove in communication with the combustion chamber.

8. The method of claim 1, further comprising operating the at least one oxy-fuel burner with a fuel selected from blast furnace gas, converter top gas, coke oven gas, natural gas, propane, liquefied petroleum gases, and mixtures thereof.

9. The method of claim 1, further comprising operating the at least one oxy-fuel burner with at least one of substantially pure oxygen containing at least 85% oxygen or a blend of substantially pure oxygen diluted with recirculated flue gas.

10. The method of claim 1, further comprising operating the at least one oxy-fuel burner with oxygen in excess of a stoichiometric combustion requirement of the fuel delivered through said at least one oxy-fuel burner.

11. The method of claim 1, further comprising providing at least one oxygen lance in communication with the combustion chamber for delivering an oxidant including the balance of oxygen required for combustion in the combustion chamber.

12. The method of claim 11, further comprising recirculating the combustion gases in the combustion chamber outside of a combustion region of the combustion chamber, supplying the oxidant to the combustion chamber at a high velocity through the at least one oxygen lance, and entraining the combustion gases in the combustion chamber for diluting a flame in the combustion chamber.

13. The method of claim 12, wherein the high velocity of the oxidant is at a velocity of at least 200 m/s.

14. The method of claim 11, further comprising delivering a stream of mixed oxygen and recycled flue gas through the at least one oxygen lance to the combustion chamber.

15. The method of claim 1, further comprising supplying the fuel adjacent to the enriching the combustion chamber with oxygen, and entraining said fuel in the combustion gases.

16. The method of claim 1, further comprising recycling a sufficient portion of the combustion gases to maintain gas mass flow per time unit through the refractory material at a level being at least equal to the gas mass flow per time unit used when the burner was operated without recycling.

17. The method of claim 1, further comprising providing a main burner for the combustion chamber for combusting fuel in the combustion chamber and operating the at least one oxy-fuel burner for yielding an oxygen concentration less than 40% at the main burner.

* * * * *